US007809990B2

(12) United States Patent
Sasaki

(10) Patent No.: US 7,809,990 B2
(45) Date of Patent: Oct. 5, 2010

(54) METHOD AND APPARATUS FOR MONITORING FAILURE OF MEMORY DEVICE, AND COMPUTER PRODUCT

(75) Inventor: Makoto Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1013 days.

(21) Appl. No.: 11/086,203

(22) Filed: Mar. 23, 2005

(65) Prior Publication Data

US 2006/0126211 A1 Jun. 15, 2006

(30) Foreign Application Priority Data

Dec. 9, 2004 (JP) ............................. 2004-356710

(51) Int. Cl.
*G06F 11/00* (2006.01)
(52) U.S. Cl. ........................................................ 714/42
(58) Field of Classification Search .................... 714/42
See application file for complete search history.

(56) References Cited

U.S. PATENT DOCUMENTS

| 6,707,630 | B2 | 3/2004 | Doi et al. | |
| 6,895,300 | B2* | 5/2005 | Goodman et al. | 700/213 |
| 7,206,151 | B2* | 4/2007 | Kimura et al. | 360/53 |
| 7,349,175 | B2* | 3/2008 | McIntosh et al. | 360/91 |
| 7,359,153 | B2* | 4/2008 | Asano | 360/132 |
| 2003/0067701 | A1* | 4/2003 | Christie, Jr. | 360/60 |
| 2005/0044451 | A1* | 2/2005 | Fry et al. | 714/38 |
| 2005/0052772 | A1* | 3/2005 | Barbian et al. | 360/69 |
| 2005/0169126 | A1* | 8/2005 | Wakelin et al. | 369/30.38 |
| 2005/0261800 | A1* | 11/2005 | Goodman et al. | 700/214 |
| 2006/0013078 | A1* | 1/2006 | Goodman et al. | 369/30.01 |
| 2006/0026623 | A1* | 2/2006 | Asano | 720/729 |
| 2006/0053338 | A1* | 3/2006 | Cousins et al. | 714/6 |
| 2006/0072234 | A1* | 4/2006 | Biskeborn et al. | 360/69 |
| 2006/0126211 | A1* | 6/2006 | Sasaki | 360/74.4 |
| 2006/0129613 | A1* | 6/2006 | Goodman et al. | 707/202 |
| 2006/0161730 | A1* | 7/2006 | Chang et al. | 711/111 |
| 2006/0161935 | A1* | 7/2006 | Johnson et al. | 720/645 |
| 2008/0010396 | A1* | 1/2008 | Itou et al. | 711/100 |
| 2008/0244318 | A1* | 10/2008 | Guha | 714/37 |

FOREIGN PATENT DOCUMENTS

| JP | 63-20701 | 1/1988 |
| JP | 7-141124 | 6/1995 |
| JP | 2000-76020 | 3/2000 |
| JP | 2002-288906 | 10/2002 |
| WO | WO 01/26112 | 4/2001 |

OTHER PUBLICATIONS

Office Action mailed on Aug. 26, 2008 and issued in corresponding Japanese Patent Application No. 2004-356710.
Office Action issued in corresponding Japanese Patent Application No. 2004-356710, mailed on Dec. 11, 2007.

* cited by examiner

*Primary Examiner*—Robert Beausoliel
*Assistant Examiner*—Amine Riad
(74) *Attorney, Agent, or Firm*—Staas & Halsey LLP

(57) ABSTRACT

A memory data reader of a magnetic tape library device reads from a memory of a magnetic tape cartridge containing a magnetic tape, information pertaining to data read from or written to the magnetic tape by a magnetic tape drive device. A maintenance/replace determining unit determines whether the magnetic tape drive device needs maintenance or replacement from the read information.

12 Claims, 8 Drawing Sheets

FIG.3

MAGNETIC TAPE CARTRIDGE DATA
(S/N:CG11111)
43

| DATE | MAGNETIC TAPE DRIVE DEVICE S/N | ERROR RATE | CUMULATIVE READ/WRITE DURATION | CUMULATIVE MOUNT COUNT |
|---|---|---|---|---|
| 04/08/22 12:11:04 | DV00005 | 2.3E-03 | 03:45:02 | 4 |
| 04/08/05 03:26:51 | DV00005 | 1.0E-03 | 02:50:03 | 3 |
| 04/07/29 23:43:10 | DV00004 | 1.8E-05 | 01:58:22 | 2 |
| 04/07/28 22:34:13 | DV00003 | 2.0E-05 | 01:15:50 | 1 |
| ... | ... | ... | ... | ... |

FIG.4

MAGNETIC TAPE
DRIVE DEVICE DATA
(S/N:DV00005)
44

| DATE | MAGNETIC TAPE CARTRIDGE S/N | ERROR RATE | CUMULATIVE READ/WRITE DURATION | CUMULATIVE LOAD COUNT |
|---|---|---|---|---|
| 04/08/22 12:11:04 | CG11111 | 2.3E-03 | 03:50:02 | 68 |
| 04/08/10 23:41:24 | CG33333 | 1.0E-03 | 02:55:03 | 67 |
| 04/08/05 03:26:51 | CG11111 | 1.0E-03 | 02:04:31 | 66 |
| 04/07/28 06:12:26 | CG44444 | 2.0E-05 | 01:15:50 | 65 |
| 04/07/28 15:31:15 | CG22222 | 1.4E-05 | 00:50:01 | 64 |
| . . . | . . . | . . . | . . . | . . . | ical tape library device 1. FIG. 8 is a perspective of a conventional
METHOD AND APPARATUS FOR MONITORING FAILURE OF MEMORY DEVICE, AND COMPUTER PRODUCT

BACKGROUND OF THE INVENTION

1) Field of the Invention

The present invention relates to a monitoring apparatus that monitors a likelihood of an imminent failure of a memory device.

2) Description of the Related Art

Magnetic tape libraries that can store large volumes of data conventionally use magnetic tape cartridges that conform to Linear Tape-Open (LTO) standards or Advanced Intelligent Tape (AIT) standards. A typical magnetic tape cartridge generally has a built-in flash memory such as a Cartridge (CM) or a Memory in Cassette (MIC) for storing various types of management data.

FIG. 7 is a perspective of a conventional magnetic tape library device 1. FIG. 8 is a perspective of a conventional magnetic tape cartridge containing a flash memory. The magnetic tape library device 1 includes a magnetic tape cartridge 2, a magnetic tape drive device 3, and a robot hand 4.

The robot hand 4 pulls out the magnetic tape cartridge 2 from a cartridge cell into which the magnetic tape cartridge 2 is housed and places it in the magnetic tape drive device 3 that writes data to or reads data from the magnetic tape cartridge 2.

Once the data is written to or read from the magnetic tape cartridge 2, the robot hand 4 removes the magnetic tape cartridge 2 from the magnetic tape drive device 3 and places it back in a predetermined place in the cartridge cell.

As shown in FIG. 8, the magnetic tape cartridge 2 has a flash memory 5 built into it. The flash memory 5 stores management data such as location information of data, tracking of usage of the magnetic tape cartridge 2, error log, etc.

The magnetic tape drive device 3 carries out the writing or the reading of the management data. If a read error or a write error occurs, the magnetic tape cartridge 2 is pulled out of the magnetic tape library device 1 and placed in another magnetic tape drive, which then reads the management data from the flash memory 5 to analyze why read error or write error has occurred.

However, in this method, since the management data is accessed for the first time after a read error or a write error, there is a likelihood that the data stored in the magnetic tape cannot be accessed.

To counter this problem, a device is disclosed in Japanese Patent Laid-Open Publication No. 2002-288906 in which information pertaining to failure arising from a faulty magnetic tape cartridge is stored in the flash memory of the magnetic tape cartridge and the likelihood of future failure is determined by reading this failure information. Another device disclosed in International Publication No. W001/026112 stores information pertaining to read or write conditions of the magnetic tape cartridge and determines the life of the magnetic tape cartridge based on the information.

However, even though it is possible in the conventional technology to determine the likelihood of failure of to the magnetic tape cartridge or determine the life of the magnetic tape cartridge by reading the management data stored in the magnetic tape cartridge, failure of to the magnetic tape drive device cannot be determined.

To be specific, since apart from a failure of the magnetic tape cartridge, a failure of the magnetic tape drive device can also cause read error or write error, there is no method in place for effectively determining the latter.

SUMMARY OF THE INVENTION

It is an object of the present invention to at least solve the problems in the conventional technology.

According to an aspect of the present invention, a monitoring apparatus monitors a storage device that writes data in or reads data from a storage medium, wherein the storage medium and a memory that stores therein information pertaining to data read from or written to the storage medium by the storage device are included in a cartridge. The monitoring apparatus includes a information reading unit that reads the information from the memory; and a determining unit that determines whether the storage device needs maintenance or replacement based on the information read by the information reading unit.

A method according to another aspect of the present invention is a method of monitoring a storage device that writes data in or reads data from a storage medium, wherein the storage medium and a memory that stores therein information pertaining to data read from or written to the storage medium by the storage device are included in a cartridge. The method includes reading the information from the memory; and determining whether the storage device needs maintenance or replacement based on the information read at the reading.

A computer-readable recording medium according to still another aspect of the present invention stores therein a computer program that implements the above method on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is an exemplary contents of magnetic tape cartridge data shown in FIG. 2;

FIG. 4 is an exemplary contents of magnetic tape drive device data shown in FIG. 2;

DETAILED DESCRIPTION

Exemplary embodiments of the present invention are explained next with reference to the accompanying drawings. Furthermore, the process involved in the determination of whether the magnetic tape cartridge or the magnetic tape drive device in the magnetic tape library device, like the one shown in FIG. 7, needs to be replaced or needs maintenance is explained.

Not only can the present invention be applied to magnetic tape library devices, it can also be applied to optical disk library devices, magneto optical disk library devices, and the like.

Figure 1:
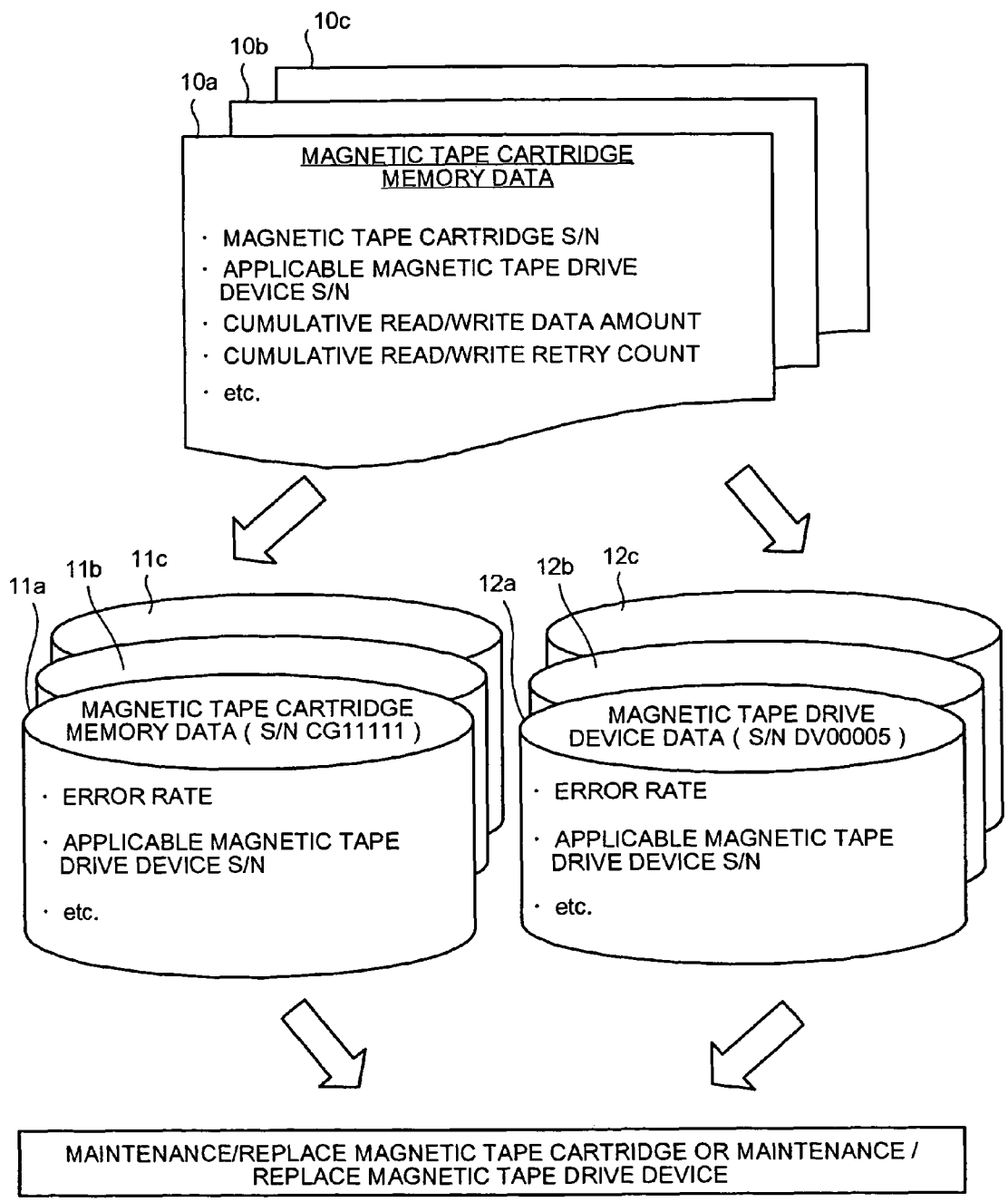
FIG. 1 is a schematic for illustrating the concept of a monitoring process according to the present invention.

The concept of a monitoring process according to the present invention is explained first. FIG. 1 is a schematic for illustrating the concept of the monitoring process according to the present invention. When a magnetic tape cartridge is inserted into a magnetic tape drive device or when the magnetic tape cartridge is removed from the magnetic tape drive device, a memory data reading device installed in a robot hand that grips the magnetic tape cartridge reads memory data $10a$ through $10c$ stored in a flash memory of the magnetic tape cartridge.

The memory data $10a$ through $10c$ includes information such as magnetic tape cartridge serial number (S/N), applicable magnetic tape drive device S/N, cumulative read/write data amount, cumulative read/write retry count, etc.

Magnetic tape cartridge S/N refers to the serial number of the magnetic tape cartridge from where the memory data $10a$ through $10c$ is read. Applicable magnetic tape drive device S/N refers to the serial number of the magnetic tape drive device where the magnetic tape cartridge is inserted for read or write.

Cumulative read/write data amount refers to the cumulative data amount that is read from or written to the magnetic tape cartridge. Cumulative read/write retry count refers to information related to the cumulative retry count in the event of failed reading from or writing to the magnetic tape cartridge.

In the monitoring process, the memory data $10a$ through $10c$ read from the magnetic tape cartridge is stored in databases as magnetic tape cartridge data $11a$ through $11c$ and magnetic tape drive device data $12a$ through $12c$.

To be specific, the magnetic tape cartridge data $11a$ through $11c$ includes information pertaining to an error rate, applicable magnetic tape drive device S/N, etc. The error rate is obtained by dividing the cumulative read/write retry count by the cumulative read/write data amount.

The magnetic tape drive device data $12a$ through $12c$ includes information pertaining to the error rate, the magnetic tape cartridge S/N of the magnetic tape cartridge that is inserted into the magnetic tape drive device for data reading or writing.

The magnetic tape cartridge data $11a$ through $11c$ and the magnetic tape drive device data $12a$ through $12c$ are used for determining whether the magnetic tape cartridge or the magnetic tape drive device needs to be replaced or needs maintenance.

To be specific, in the monitoring process, it is determined by referring to the magnetic tape cartridge data $11a$ through $11c$ whether the error rates of a given magnetic tape cartridge calculated at a plurality of points in time are above a predetermined threshold value.

If the error rates are above the threshold value, it is further determined whether at these points in time a single magnetic tape drive device tried to read from or write to the magnetic tape cartridge.

If it is determined that attempts to read from and write to the magnetic tape cartridge were made by several magnetic tape drive devices, then it can be predicted that there is a likelihood of an imminent failure of the magnetic tape cartridge.

If the magnetic tape library device is the same at all points in time, it would be still unclear as to whether the fault lies with the magnetic tape cartridge or the magnetic tape drive device. Hence, to identify where the fault lies, the magnetic tape drive device data $12a$ through $12c$ is referred to and it is checked whether the error rate exceeds the threshold value when reading from or writing to other magnetic tape cartridges as well.

If it is found that the error rate exceeds the threshold value when reading from or writing to other magnetic tape cartridges, it can be surmised that an imminent failure is likely to occur in the magnetic tape drive.

If the error rate does not exceed the threshold value when reading from or writing to other magnetic tape cartridges, it can be surmised that an imminent failure is likely to occur the magnetic tape cartridge.

Thus, the monitoring process not only determines whether the magnetic tape cartridge is likely to fail, but also determines whether the magnetic tape library device is likely to fail, and thereby give a user an idea as to whether it is the existing magnetic tape cartridge or the magnetic tape drive device that needs to be replaced or needs maintenance.

Figure 2:
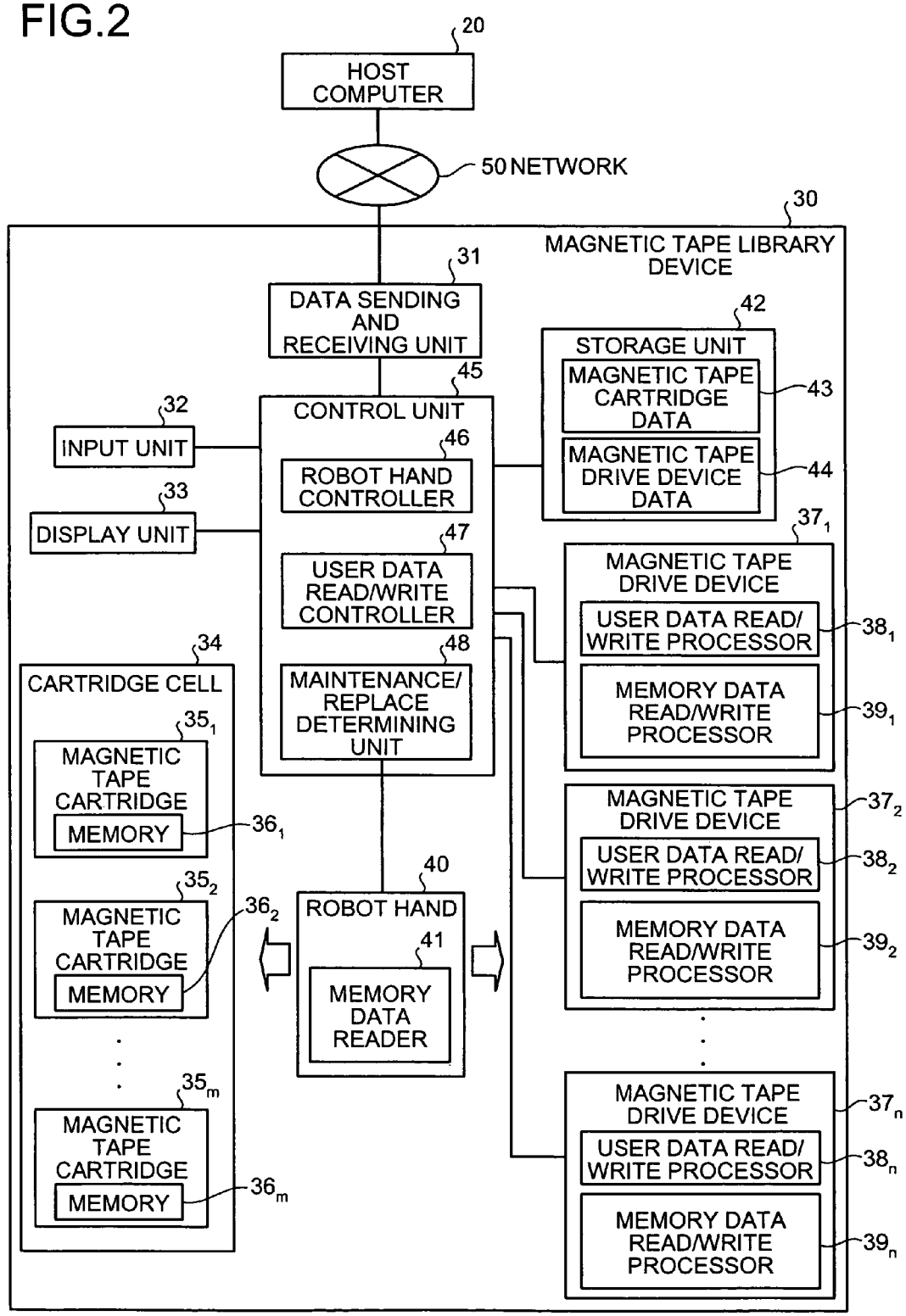
FIG. 2 is a functional configuration of a magnetic tape library device according to an embodiment of the present invention.

A functional configuration of a magnetic tape library according to an embodiment of the present invention is explained next. FIG. 2 is a functional configuration of a magnetic tape library device 30 according to an embodiment of the present invention. The magnetic tape library device 30 is connected to a host computer 20 via a network 50. The host computer 20 is a computer that makes a data store request or a data read request to the magnetic tape library device 30.

Figure 7:
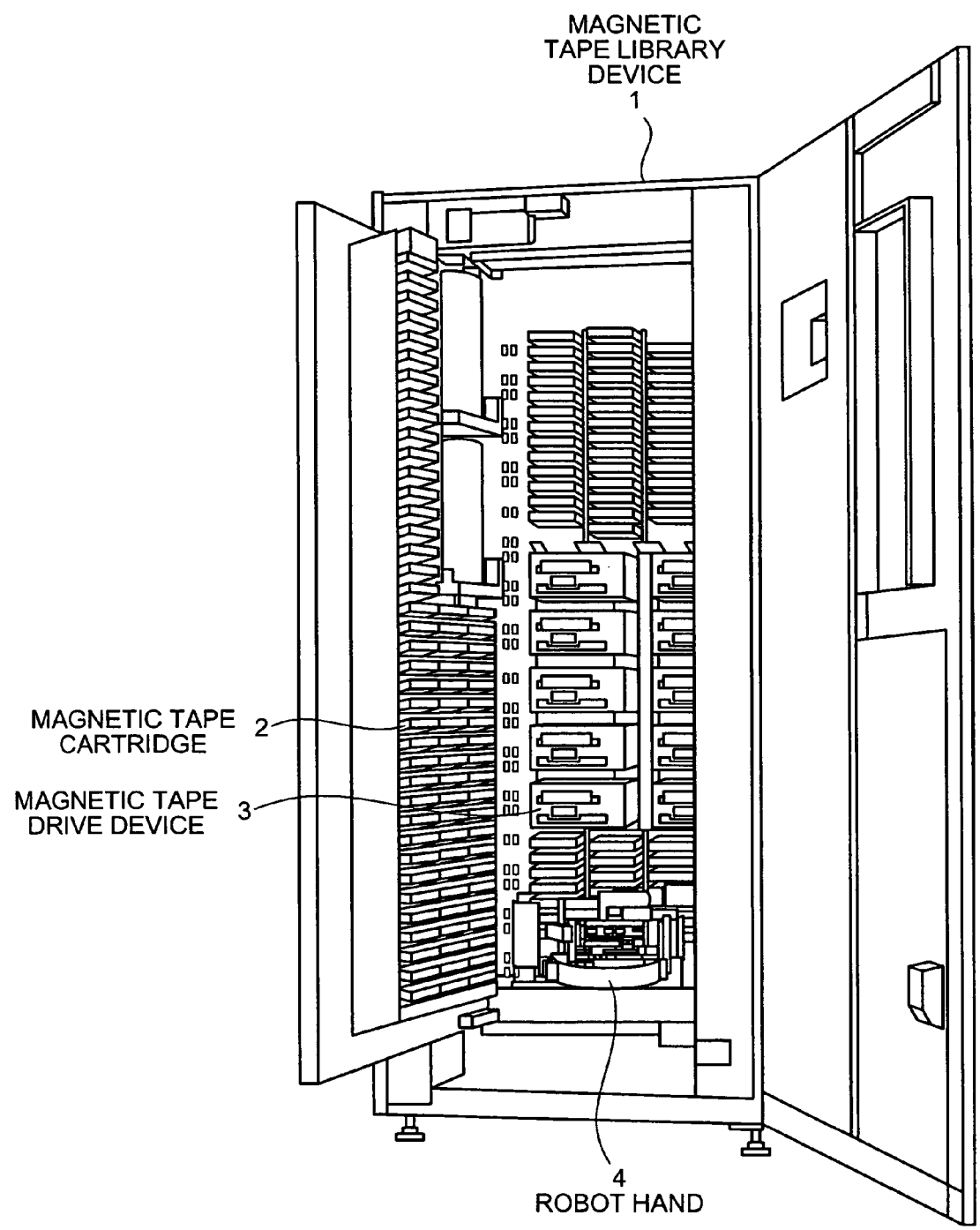
FIG. 7 is a perspective of a conventional magnetic tape library device.
Figure 8:
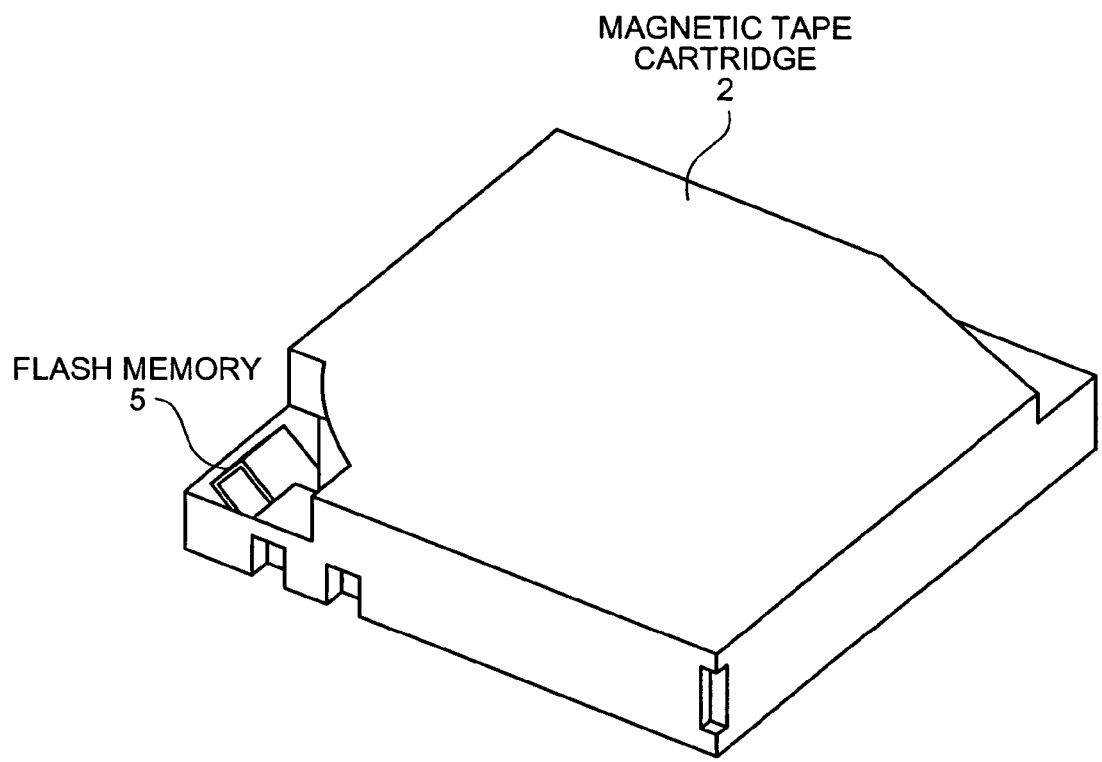
FIG. 8 is a perspective of a conventional magnetic tape cartridge containing a flash memory.

The magnetic tape library device 30 is a storage device that pulls out the magnetic tape cartridge from which data is to be read or to which data is to be written from a cartridge cell and sets the magnetic tape cartridge in the magnetic tape drive device so that data can be read from or written to, as explained with reference to FIG. 7.

The magnetic tape library device 30, apart from performing data reading and data writing, also determines the likelihood of occurrence of failure in the magnetic tape cartridge and the magnetic tape drive device and notifies the user of the imminent failure.

The magnetic tape library device 30 includes a data sending and receiving unit 31, an input unit 32, a display unit 33, a cartridge cell 34, magnetic tape drive devices $37_1$ through $37_n$, a robot hand 40, a storage unit 42, and a control unit 45.

The data sending and receiving unit 31 is a network interface that carries out exchange of data between the magnetic tape library device 30 and the host computer 20 via the network 50. The input unit 32 is an input device such as a touch panel or a switch, and the like. The display unit 33 is a display device such as a liquid crystal display, and the like.

The cartridge cell 34 houses magnetic tape cartridges $35_1$ through $35_m$. Each of the magnetic tape cartridges $35_1$ through $35_m$ is provided with a memory $36_1$ through $36_m$ in which the memory data $10a$ through $10c$ shown in FIG. 1 is stored.

The magnetic tape drive device $37_1$ through $37_n$ stores data in or reads data from the magnetic tape of the magnetic tape cartridge $35_1$ through $35_m$. The magnetic tape drive device $37_1$ through $37_n$ includes a user data read/write processor $38_1$ through $38_n$ and a memory data read/write processor $39_1$ through $39_n$.

The user data read/write processor $38_1$ through $38_n$ reads data from or stores data in the magnetic tape of the magnetic tape cartridge $35_1$ through $35_m$ according to the read request or the write request received from the host computer 20.

The memory data read/write processor $39_1$ through $39_n$ stores the memory data $10a$ through $10c$ shown in FIG. 1 in the memory $36_1$ through $36_m$ of the magnetic tape cartridge $35_1$ through $35_m$, and reads the memory data $10a$ through $10c$ from the memory $36_1$ through $36_m$.

To be specific, when the user data read/write processor $38_1$ through $38_n$ of the magnetic tape drive device $37_1$ through $37_n$ executes data reading or data writing, the memory data read/write processor $39_1$ through $39_n$ stores the serial number of the relevant magnetic tape drive device $37_1$ through $37_n$ in the memory $36_1$ through $36_m$.

Further, the memory data read/write processor $39_1$ through $39_n$ stores in the memory $36_1$ through $36_m$ the cumulative data amount of the data read from or written to the magnetic tape.

Furthermore, when there are several attempts to read or write data, the memory data read/write processor $39_1$ through $39_n$ stores the cumulative retry count in the memory $36_1$ through $36_m$.

The robot hand 40 pulls out the magnetic tape cartridge $35_1$ through $35_m$ from the cartridge cell 34, places it in the magnetic tape drive device $37_1$ through $37_n$, and removes the magnetic tape cartridge $35_1$ through $35_m$ from the magnetic tape drive device $37_1$ through $37_n$ and places it back in a predetermined place in the cartridge cell 34.

The robot hand 40 includes a memory data reader 41. The memory data reader 41 reads the memory data 10a through 10c from the memory $36_1$ through $36_m$ of the magnetic tape cartridge $35_1$ through $35_m$.

The storage unit 42 is a storage device of flash memory, etc. The storage unit 42 stores magnetic tape cartridge data 43 and magnetic tape drive device data 44, which correspond respectively to the magnetic tape cartridge data 11a through 11c and the magnetic tape drive device data 12a through 12c shown in FIG. 1.

FIG. 3 is an example of contents of the magnetic tape cartridge data 43. The magnetic tape cartridge data 43 is stored separately for each of the magnetic tape cartridges $35_1$ through $35_m$. FIG. 3 shows the magnetic tape cartridge data of the magnetic tape cartridge $35_1$ through $35_m$ whose serial number is "CG111111".

As shown in FIG. 3, the magnetic tape cartridge data 43 includes the fields "Date", "Magnetic tape drive device S/N", "Error rate", "Cumulative read/write duration", and "Cumulative mount count".

The field "Date" indicates the date and time when the data is stored in the magnetic tape cartridge data 43. The field "Magnetic tape drive device S/N" indicates the serial number of the magnetic tape drive device $37_1$ through $37_n$ that carries out the reading from or writing to the magnetic tape cartridge $35_1$ through $35_m$.

The field "Error rate" indicates in the form of a numerical value the rate of occurrence of error when reading from or writing to the magnetic tape cartridge $35_1$ through $35_m$. In the present embodiment, the error rate is taken as a value obtained by dividing the cumulative read/write retry count by cumulative read/write data amount.

For instance, when reading or writing of 1000 MB data is carried out, and when the cumulative retry count is 5, the error rate will be 5/1000=5.0E–3.

However, other methods may be employed for defining the error rate. For instance, separate error rates may be calculated for data reading and data writing.

The field "Cumulative read/write duration" indicates the cumulative duration in which data was read from or written to the magnetic tape cartridge $35_1$ through $35_m$. The field "Cumulative mount count" indicates the cumulative number of times the magnetic tape cartridge $35_1$ through $35_m$ is mounted on the magnetic tape drive device $37_1$ through $37_n$.

FIG. 4 is a drawing of an example of the magnetic tape drive device data 44 shown in FIG. 2. The magnetic tape drive device data 44 is stored separately for each of the magnetic tape drive devices $37_1$ through $37_n$. FIG. 4 is the magnetic tape drive device data 44 of the magnetic tape drive device $37_1$ through $37_n$ whose serial number is "DV00005".

As shown in FIG. 4, the magnetic tape drive device data 44 includes the fields "Date", "Magnetic tape cartridge S/N", "Error rate", "Cumulative read/write duration", and "Cumulative load count".

The field "Date" indicates the date and time when the data is stored in the magnetic tape drive device data 44. The field "Magnetic tape cartridge S/N" indicates the serial number of the magnetic tape cartridge $35_1$ through $35_m$ to which data is written or from which data is read by the magnetic tape drive device $37_1$ through $37_n$.

The field "Error rate" is similar to the error rate explained with reference to FIG. 3 and indicates in the form of a numerical value the rate of occurrence of error. The field "Cumulative read/write duration" indicates the cumulative duration in which the magnetic tape drive device 371 through $37_n$ reads data from or writes data to the magnetic tape cartridge $35_1$ through $35_m$. The field "Cumulative load count" indicates a cumulative number of times the magnetic tape cartridge $35_1$ through $35_m$ is loaded on the magnetic tape drive device $37_1$ through $37_n$.

To return to FIG. 2, the control unit 45 controls the entire magnetic tape library device 30. The control unit 45 includes a robot hand controller 46, a user data read/write controller 47, and a maintenance/replace determining unit 48.

The robot hand controller 46 controls the robot hand 40 so that the robot hand 40 can insert the magnetic tape cartridge $35_1$ through $35_m$ into the magnetic tape drive device $37_1$ through $37_n$ or remove the magnetic tape cartridge $35_1$ through $35_m$ from the magnetic tape drive device $37_1$ through $37_n$.

When the magnetic tape cartridge $35_1$ through $35_m$ is being inserted or removed, the robot hand controller 46 further exerts control so that the memory data reader 41 reads the memory data 10a through 10c from the memory $36_1$ through $36_m$ of the magnetic tape cartridge $35_1$ through $35_m$.

The user data read/write controller 47 requests, based on the data read request or the data write request received from the host computer 20, the robot hand controller 46 to place the magnetic tape cartridge $35_1$ through $35_m$ to which data is to written or from which data is to be read in the magnetic tape drive device $37_1$ through $37_n$.

Further, the user data read/write controller 47 requests the magnetic tape drive device $37_1$ through $37_n$ to read or write the data requested by the host computer 20.

The maintenance/replace determining unit 48 calculates the error rate based on the memory data 10a through 10c read by the memory data reader 41 of the robot hand 40 and stores the calculated error rate in the magnetic tape cartridge data 43 and the magnetic tape drive device data 44 along with the date, the magnetic tape cartridge S/N, and the magnetic tape drive device S/N.

The maintenance/replace determining unit 48 further calculates the cumulative read/write duration of the magnetic tape cartridge $35_1$ through $35_m$ and the magnetic tape drive device $37_1$ through $37_n$, counts the cumulative mount count and the cumulative load count, and stores these three data in the magnetic tape cartridge data 43 and the magnetic tape drive device data 44.

Further, when the robot hand 40 is inserting the magnetic tape cartridge $35_1$ through $35_m$ into the magnetic tape drive device $37_1$ through $37_n$ or removing the magnetic tape cartridge $35_1$ through $35_m$ from the magnetic tape drive device $37_1$ through $37_n$, the maintenance/replace determining unit 48 determines whether the magnetic tape cartridge $35_1$ through $35_m$ or the magnetic tape drive device $37_1$ through $37_n$ needs to be replaced or needs maintenance.

To be specific, the maintenance/replace determining unit 48 refers to the magnetic tape cartridge data 43 to determine whether there are any magnetic tape cartridges $35_1$ through $35_m$ whose error rates calculated at a plurality of points of time are above a predetermined value. A value that is below a level that causes a fatal error in the magnetic tape cartridge $35_1$ through $35_m$ or the magnetic tape drive device $37_1$ through $37_n$ is set as the threshold value.

For instance, the maintenance/replace determining unit 48 determines whether two successive error rates of any magnetic tape cartridge $35_1$ through $35_m$ in the magnetic tape cartridge data 43 exceeds the threshold value.

In the magnetic tape cartridge data 43 shown FIG. 3, if "1.0E−3" is set as the threshold value, the error rates corresponding to the dates "04/08/22, 12:11:04" and "04/08/05, 03:26:51" would be two successive error rates exceeding the threshold value.

If a magnetic tape cartridge $35_1$ through $35_m$ is found having the error rates calculated at different points of time above the threshold value, the maintenance/replace determining unit 48 determines whether a single magnetic tape drive device $37_1$ through $37_n$ carried out the reading or writing in all the cases.

If the magnetic tape drive devices $37_1$ through $37_n$ are found to be different, the maintenance/replace determining unit 48 predicts that an imminent failure of the magnetic tape cartridge $35_1$ through $35_m$ is highly likely.

In the magnetic tape cartridge data 43 shown in FIG. 3, the magnetic tape drive device S/N corresponding to the dates "04/08/22, 12:11:04" and "04/08/05, 03:26:51" is the same, that is "DV00005", and is contrary to the case described above and consequently it is unclear whether the magnetic tape cartridge $35_1$ through $35_m$ is likely to fail or the magnetic tape drive device $37_1$ through $37_n$ is likely to fail.

When the magnetic tape drive device $37_1$ through $37_n$ is the same, the maintenance/replace determining unit 48 refers to the magnetic tape drive device data 44 shown in FIG. 4, and determines whether the error rate exceeds the threshold value when the relevant magnetic tape drive device $37_1$ through $37_n$ reads from or writes to other magnetic tape cartridges $35_1$ through $35_m$.

If the error rates exceed the threshold value when reading from or writing to other magnetic tape cartridges $35_1$ through $35_m$, the maintenance/replace determining unit 38 predicts that an imminent failure of magnetic tape drive device $37_1$ through $37_n$ is highly likely.

If the error rates do not exceed the threshold value when reading from or writing to other magnetic tape cartridges $35_1$ through $35_m$, the maintenance/replace determining unit 48 predicts that an imminent failure of the magnetic tape cartridge $35_1$ through $35_m$ is highly likely.

In the magnetic tape drive device data 44 shown in FIG. 4, apart from the magnetic tape cartridge $35_1$ through $35_m$ with the serial number "CG11111", the magnetic tape cartridge $35_1$ through $35_m$ with the serial number "CG33333" also has an error rate that exceeds the threshold value. Consequently, the maintenance/replace determining unit 48 predicts that an imminent failure of the magnetic tape drive device $37_1$ through $37_n$ is highly likely.

The maintenance/replace determining unit 48 outputs the result of determination on the display unit 33, and notifies the user that the magnetic tape cartridge $35_1$ through $35_m$ or the magnetic tape drive device $37_1$ through $37_n$ needs to be replaced or needs maintenance.

Figure 5:
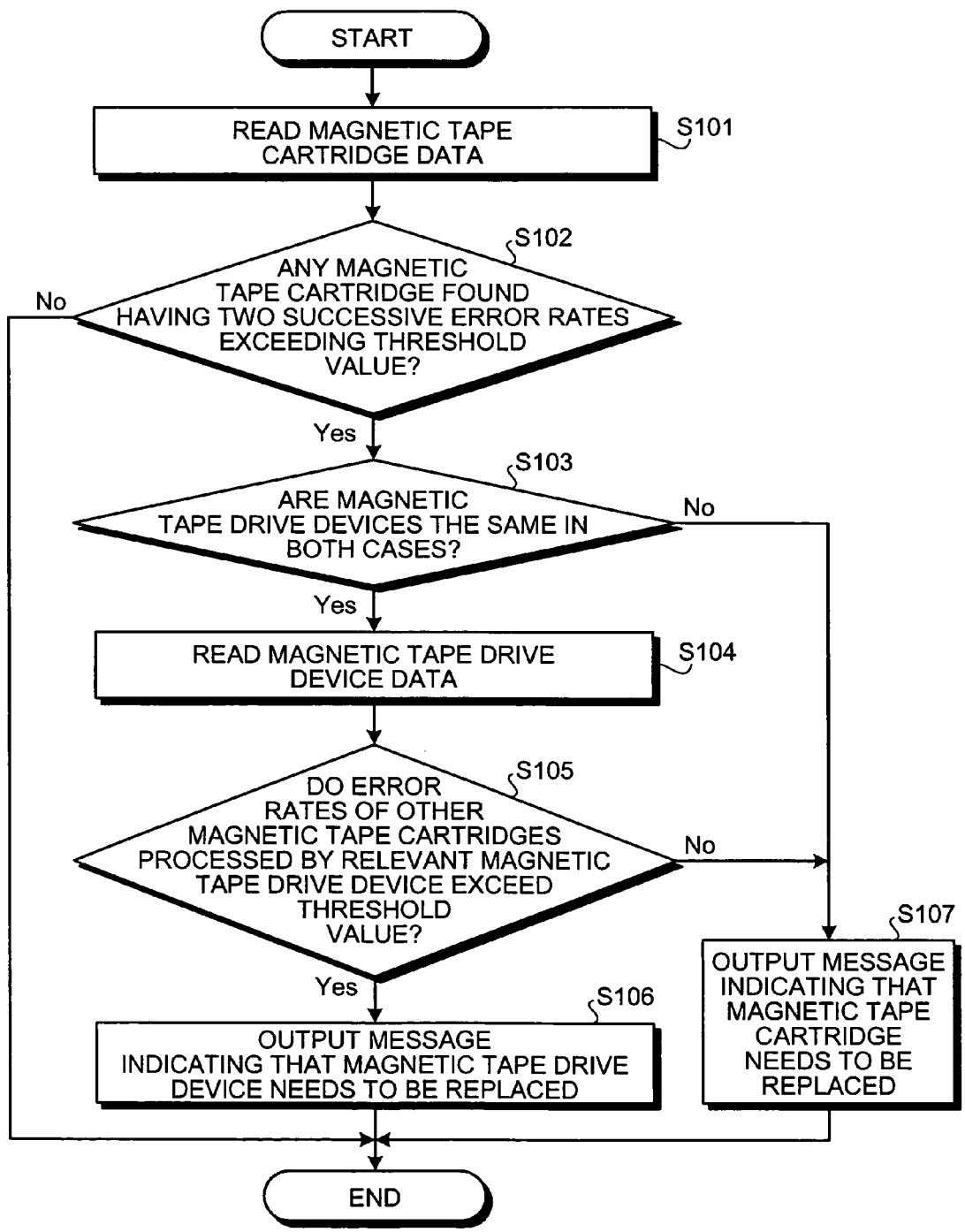
FIG. 5 is a flowchart of a monitoring process according to the embodiment.

A monitoring process according an embodiment of the present invention is explained next. FIG. 5 is a flow chart of the monitoring process according to an embodiment of the present invention.

As shown in FIG. 5, the maintenance/replace determining unit 48 of the magnetic tape drive device 30 reads the magnetic tape cartridge data 43 from the storage unit 42 (step S101).

The maintenance/replace determining unit 48 refers to the data in the magnetic tape cartridge data 43 determines whether any magnetic tape cartridge $35_1$ through $35_m$ has two successive error rates that exceed the predetermined threshold value (step S102).

If there are no magnetic tape cartridges $35_1$ through $35_m$ with two successive error rates that exceed the threshold value ("No" at step S102), the process ends there.

If a magnetic tape cartridge $35_1$ through $35_m$ with two successive error rates that exceed the threshold value is found ("Yes" at step S102), the maintenance/replace determining unit 48 refers to the data stored in the magnetic tape cartridge data 43 and determines whether the magnetic tape drive devices $37_1$ through $37_n$ that performed the reading or writing operation in both the cases are the same (step S103).

The magnetic tape drive devices $37_1$ through $37_n$ in the two cases are not the same ("No" at step S103), the maintenance/replace determining unit 48 predicts that there is a likelihood of an imminent failure of the magnetic tape cartridge $35_1$ through $35_m$, and outputs a message indicating that the magnetic tape cartridge $35_1$ through $35_m$ needs to be replaced (step S107), ending the monitoring process.

If the magnetic tape drive device $37_1$ through $37_n$ is the same in both the cases ("Yes" at step S103), the maintenance/replace determining unit 48 reads the magnetic tape drive device data 44 from the storage unit 42 (step S104).

Next, the maintenance/replace determining unit 48 retrieves the error rate data of the magnetic tape drive device $37_1$ through $37_n$ when reading from or writing to other magnetic tape cartridges $35_1$ through $35_m$ and checks whether those error rates exceed the threshold value (step S105).

If the error rates with regard to other magnetic tape cartridges $35_1$ through $35_m$ do not exceed the threshold value ("No" at step S105), the process proceeds to step S107 at which the maintenance/replace determining unit 48 predicts that an imminent failure of the magnetic tape cartridge $35_1$ through $35_m$ is highly likely, and outputs a message indicating that the magnetic tape cartridge $35_1$ through $35_m$ needs to be replaced, ending the monitoring process.

If the error rates exceed the threshold value ("Yes" at step S105), the maintenance/replace determining unit 48 predicts that an imminent failure of the magnetic tape drive device $37_1$ through $37_n$ is highly likely, and outputs a message indicating that the magnetic tape drive device $37_1$ through $37_n$ needs to be replaced (step S106), ending the monitoring process.

In the monitoring process according to the present embodiment, when there is a likelihood of an imminent failure of the magnetic tape drive device $37_1$ through $37_n$ or the magnetic tape cartridge $35_1$ through $35_m$, the maintenance/replace determining unit 48 outputs a message indicating that magnetic tape drive device $37_1$ through $37_n$ or the magnetic tape cartridge $35_1$ through $35_m$ needs to be replaced. However, after referring to the magnetic tape cartridge data 43 shown in FIG. 3 or the magnetic tape drive device data 44 shown in FIG. 4, the maintenance/replace determining unit 48 may surmise various other possibilities related to replacement or maintenance of the magnetic tape drive device $37_1$ through $37_n$ or the magnetic tape cartridge $35_1$ through $35_m$.

For instance, the maintenance/replace determining unit 48 may refer to the cumulative read/write duration of the magnetic tape drive device data 44, and if the sum of the cumulative read/write durations of the magnetic tape drive device $37_1$ through $37_n$ exceeds a predetermined duration, or if the sum of the cumulative load counts exceeds a predetermined value, the maintenance/replace determining unit 48 may output either a request for cleaning the head of the magnetic tape drive device $37_1$ through $37_n$ or a request to replace the magnetic tape drive device $37_1$ through $37_n$.

Alternatively, the maintenance/replace determining unit 48 may refer to the magnetic tape cartridge data 43, and if the sum of the cumulative mount counts of the magnetic tape cartridge $35_1$ through $35_m$ exceeds a predetermined value, may output a request to replace the magnetic tape cartridge $35_1$ through $35_m$ with a new magnetic tape cartridge.

Alternatively, information pertaining to cumulative data amount of the data read from or written to the magnetic tape cartridge $35_1$ through $35_m$ may also be additionally stored in the magnetic tape drive device data 44. The maintenance/replace determining unit 48 may refer to the cumulative data amount and the cumulative read/write duration, and if the cumulative read/write duration exceeds a predetermined value (say, one hour) for reading or writing a specific amount of data (say, 36 GB), the maintenance/replace determining unit 48 may determine that the magnetic tape drive device $37_1$ through $37_n$ needs a head cleaning, and may output a request for head cleaning.

A computer may execute a ready computer program to realize the monitoring process according to the present embodiment. A computer that can execute the computer program to realize the monitoring process according to the present embodiment is explained next with reference to FIG. 6.

Figure 6:
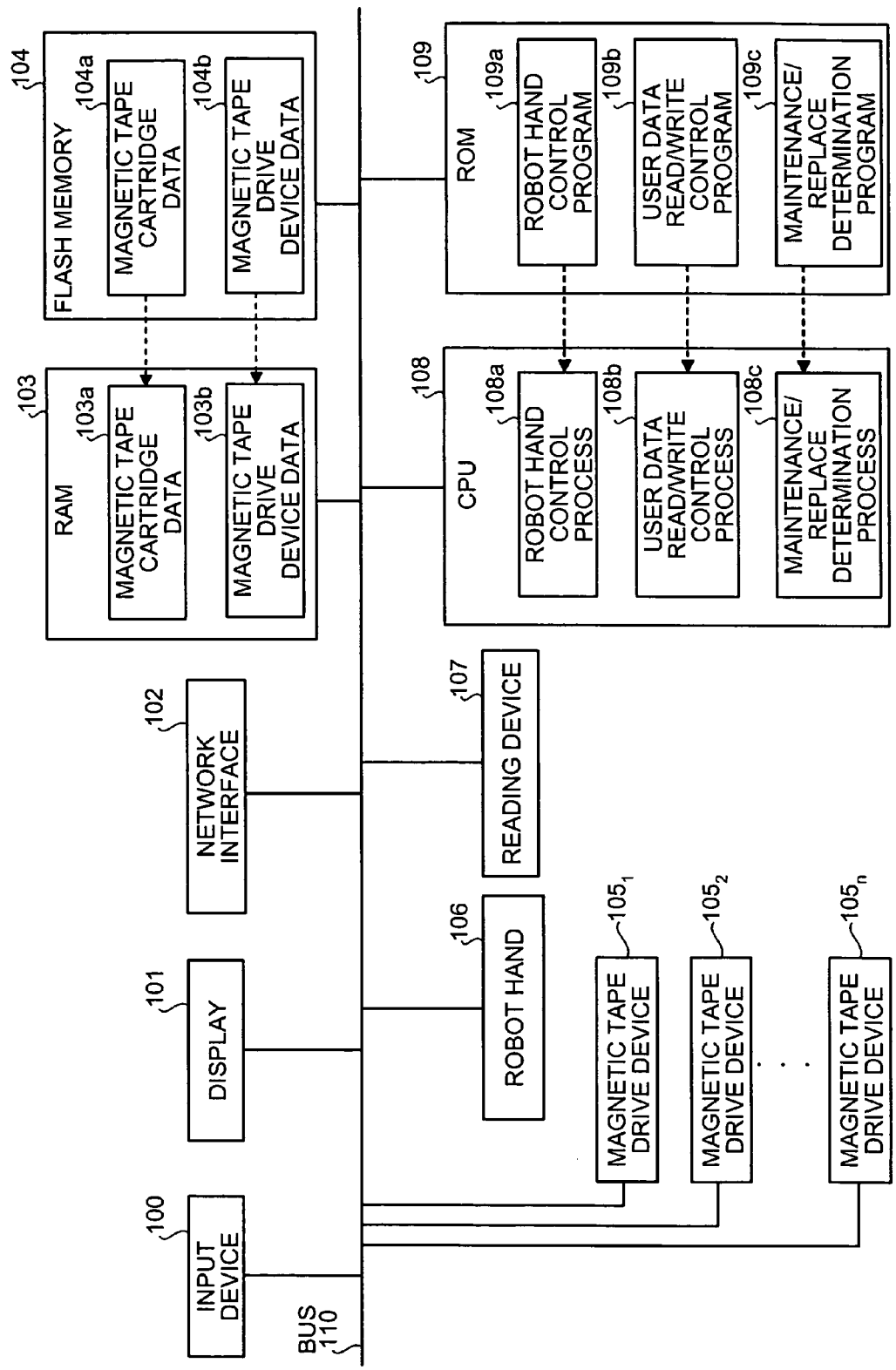
FIG. 6 is a hardware configuration of a computer that functions as a magnetic tape library device shown in FIG. 2.

FIG. 6 is a hardware configuration of a computer that functions as the magnetic tape library device 30 shown in FIG. 2. The computer includes an input device 100 that receives input of data from the user, a display 101, a network interface 102 that enables exchange of data between this computer and other computers via a network, a Random Access Memory (RAM) 103, a flash memory 104, magnetic tape drive devices $105_1$ though $105_n$, a robot hand 106, a reading device 107 that reads the programs from a recording medium on which the various programs are recorded, a central processing unit (CPU) 108, a Read Only memory (ROM) 109, and a bus 110 that connects all the parts mentioned above.

The various programs that realizes the functions similar to those of the magnetic tape library device 30, such a robot hand control program 109a, a user data read/write control program 109b, and a maintenance/replace determination program 109c shown in FIG. 6, are stored in the ROM 109.

The robot hand control program 109a, the user data read/write control program 109b, and the maintenance/replace determination program 109c may be used together or separately as required.

The CPU 108 is able to realize the functions of a robot hand control process 108a, a user data read/write control process 108b, and a maintenance/replace determination process by respectively reading the robot hand control program 109a, the user data read/write control program 109b, and the maintenance/replace determination program 109c.

The robot hand control process 108a corresponds to the robot hand controller 46 shown in FIG. 2. The user data read/write control process 108b corresponds to the user data read/write control unit shown in FIG. 2. The maintenance/replace determination process 108c corresponds to the maintenance/replace determining unit 48 shown in FIG. 2.

The flash memory 104 stores magnetic tape cartridge data 104a and magnetic tape drive device data 104b. The magnetic tape cartridge data 104a and the magnetic tape drive device data 104b correspond respectively to the magnetic tape cartridge data 43 and the magnetic tape drive device data 44 shown in FIG. 2.

The CPU 108 stores the magnetic tape cartridge data 104a and the magnetic tape drive device data 104b in the flash memory 104 as well as reads the magnetic tape cartridge data 104a and the magnetic tape drive device data 104b from the flash memory 104 and stores them in the RAM 103. Based on the magnetic tape cartridge data 104a and the magnetic tape drive device data 104b, the CPU 108 carries out data processing.

The robot hand control program 109a, the user data read/write control program 109b, and the maintenance/replace determination program 109c need not necessarily be stored in the ROM 109.

The above mentioned computer programs may be stored on a "portable physical medium" such as the insertable flexible disk (FD), compact disk-Read-Only Memory (CD-ROM), magneto optic (MO) disk, digital versatile disk (DVD), integrated circuit (IC) card, etc, or may be stored on a "fixed physical medium" such as a hard disk drive (HDD) provided inside the computer. These programs may also be stored on "another computer (or server)" connected to the computer via a public line, Internet, local area network (LAN), wide area network (WAN), etc., and may be read and executed by the computer.

Thus, according to the present embodiment, the memory data reader 41 of the magnetic data library device 30 reads from the memory of the magnetic tape cartridge $35_1$ through $35_m$ containing the magnetic tape, the information pertaining to the data read from or written to the magnetic tape cartridge $35_1$ through $35_m$ by the magnetic tape drive device $37_1$ through $37_n$. The maintenance/replace determining unit 48 determines whether the magnetic tape drive device $37_1$ through $37_n$ needs maintenance or needs to be replaced based on the information read by the memory data reader 41. Consequently, whether there is a likelihood of an imminent failure of the magnetic tape drive device $37_1$ through $37_n$ can be accurately and effectively determined.

Moreover, the memory data reader 41 of the robot hand 40 reads information pertaining to read error or write error when the magnetic tape drive device $37_1$ through $37_n$ is reading data from or writing data to the magnetic tape cartridge $35_1$ through $35_m$, as well as the identification data that distinguishes the magnetic tape drive device $37_1$ through $37_n$ and the magnetic tape cartridge $35_1$ through $35_m$. The maintenance/replace determining unit 48 determines whether the magnetic tape drive device $37_1$ through $37_n$ needs maintenance or needs to replaced, based on the information read by the memory data reader 41. Consequently, the data stored in the memory of the magnetic tape cartridge $35_1$ through $35_m$ is put to use effectively to determine accurately and effectively if there is a likelihood of an imminent failure.

Furthermore, the maintenance/replace determining unit 48 determines which of either the magnetic tape drive device $37_1$ through $37_n$ or the magnetic tape cartridge $35_1$ through $35_m$ actually needs maintenance or replacement. Consequently, it can be effectively determined if there is a likelihood of an imminent failure of the magnetic tape drive device $37_1$ through $37_n$ or the magnetic tape cartridge $35_1$ through $35_m$.

Moreover, the memory data reader 41 that reads data from the memory $36_1$ through $36_m$ of the magnetic tape cartridge $35_1$ through $35_m$ is provided on the robot hand 40 that grips and inserts the magnetic tape cartridge $35_1$ through $35_m$ into the magnetic tape drive device $37_1$ through $37_n$ as well as grips and removes the magnetic tape cartridge $35_1$ through $35_m$ from the magnetic tape drive device $37_1$ through $37_n$. Consequently, whether there is a likelihood of an imminent failure of the magnetic tape cartridge $35_1$ through $35_m$ can be determined at the instant the magnetic tape cartridge $35_1$ through $35_m$ is gripped by the robot hand 40. As a result, it is possible to effectively prevent the usage of a magnetic tape cartridge that has a high likelihood of an imminent failure.

Furthermore, the maintenance/replace determining unit 48 determines that replacement is required when the error rate exceeds the threshold value, which is calculated based on the information read by the memory data reader 41. Consequently, the situation can be remedied before the failure actually occurs.

Moreover, the error rate is calculated based on the data read/write retry count and the amount of data read or written. Consequently, it can be accurately and effectively determined if there is a likelihood of an imminent failure of the storage device or the storage medium.

According to the present invention, information pertaining to data read from or written to a storage medium by a storage device is read from a memory of a cartridge provided in a storage medium. Based on this information it is determined whether a storage device needs maintenance or needs to be replaced. Consequently, it can be accurately and effectively determined if there is a likelihood of an imminent failure of the storage device.

According to the present invention, information pertaining to read error or write error that occurs when the storage device reads data from or writes data to the storage medium as well as identification data that distinguishes the storage device and the storage medium are read. Based on this information, determination of whether the storage device needs maintenance or needs to be replaced is made. Consequently, the data stored in the memory of the cartridge can be put to use effectively to determine accurately and effectively if there is a likelihood of an imminent failure of the storage device.

According to the present invention, it is determined whether it is the storage device or the storage medium that needs maintenance or needs to be replaced. Consequently, it can be effectively determined if there is a likelihood of an imminent failure of the storage device or the storage medium.

According to the present invention, the device that reads the information from the memory of the cartridge is provided in a storage medium inserting device that grips and inserts the storage medium in the storage device or in a storage medium removing device that grips and removes the storage medium from the storage device. Consequently, whether there is a likelihood of an imminent failure of the storage medium can be determined at the instant the storage medium is gripped. As a result, it is possible to effectively prevent the usage of a storage medium that has a high likelihood of imminent failure.

According to the present invention, whether replacement is required is determined when an error rate calculated based on the read information. Consequently, the situation can be remedied before the failure actually occurs.

According to the present invention, the error rate is calculated based on a retry count pertaining to data read or written and an amount of data read or written. Consequently, it can be accurately and determined if there is a likelihood of an imminent failure of the storage device or the storage medium.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A monitoring apparatus that monitors a storage device that writes data in or reads data from a storage medium, wherein the storage medium and a memory that stores therein information pertaining to data read from or written to the storage medium by the storage device are included in a cartridge, comprising:
    an information reading unit that reads the information from the memory; and
    a determining unit that determines whether the storage device needs maintenance or replacement based on the information read by the information reading unit, wherein
    the determining unit determines that the storage device needs maintenance or replacement when a value of an error rate exceeds a threshold value, the error rate being calculated based on the information read by the information reading unit, and
    the value of the error rate is calculated by dividing a cumulative read/write retry count by a cumulative read/write data amount, the cumulative read/write retry count being a cumulative retry count of a failed reading from or failed writing to the storage medium and the cumulative read/write data amount being a cumulative data amount that is read from or written to the storage medium.

2. The monitoring apparatus according to claim 1, wherein the information stored in the memory includes a read error or a write error that occurs when the storage device reads data from or writes data to the storage medium, and identification data that distinguishes the storage device and the storage medium.

3. The monitoring apparatus according to claim 1, wherein the determining unit determines whether the storage medium needs maintenance or replacement based on the information read by the information reading unit.

4. The monitoring apparatus according to claim 3, wherein the determining unit determines that the storage medium needs maintenance or replacement when a value of an error rate exceeds a threshold value, the error rate being calculated based on the information read by the information reading unit.

5. The monitoring apparatus according to claim 4, wherein the value of the error rate is calculated based on a retry count pertaining to data writing or data reading and an amount of data written or read.

6. The monitoring apparatus according to claim 1, wherein the information reading unit is integrated with any one of a storage medium inserting device that grips and inserts the storage medium in the storage device and a storage medium removing device that grips and removes the storage medium from the storage device.

7. A method of monitoring a storage device that writes data in or reads data from a storage medium, wherein the storage medium and a memory that stores therein information pertaining to data read from or written to the storage medium by the storage device are included in a cartridge, comprising:
    reading the information from the memory; and
    determining whether the storage device needs maintenance or replacement based on the information read at the reading, wherein
    the determining includes determining that the storage device needs maintenance or replacement when a value of an error rate exceeds a threshold value, the error rate being calculated based on the information read at the reading, and the value of the error rate is calculated by dividing a cumulative read/write retry count by a cumulative read/write data amount, the cumulative read/write retry count being a cumulative retry count of a failed reading from or failed writing to the storage medium and the cumulative read/write data amount being a cumulative data amount that is read from or written to the storage medium.

8. The method according to claim 7, wherein the information stored in the memory includes a read error or a write error that occurs when the storage device reads data from or writes data to the storage medium, and identification data that distinguishes the storage device and the storage medium.

9. The method according to claim 7, wherein the determining includes determining whether the storage medium needs maintenance or replacement based on the information read at the reading.

10. The method according to claim 9, wherein the determining includes determining that the storage medium needs maintenance or replacement when a value of an error rate exceeds a threshold value, the error rate being calculated based on the information read at the reading.

11. The method according to claim 10, further comprising calculating the error rate based on a retry count pertaining to data writing or data reading and an amount of data written or read.

12. A computer-readable recording medium that stores therein a computer program that implements on a computer a method of monitoring a storage device that writes data in or reads data from a storage medium, wherein the storage medium and a memory that stores therein information pertaining to data read from or written to the storage medium by the storage device are included in a cartridge, the computer program causing the computer to execute:

reading the information from the memory; and determining whether the storage device needs maintenance or replacement based on the information read at the reading, wherein the determining includes determining that the storage device needs maintenance or replacement when a value of an error rate exceeds a threshold value, the error rate being calculated based on the information read at the reading, and the value of the error rate is calculated by dividing a cumulative read/write retry count by a cumulative read/write data amount, the cumulative read/write retry count being a cumulative retry count of a failed reading from or failed writing to the storage medium and the cumulative read/write data amount being a cumulative data amount that is read from or written to the storage medium.

* * * * *